Nov. 5, 1957 E. M. KURKECHIAN 2,811,736
WINDSHIELD WIPER

Filed Oct. 3, 1955 2 Sheets-Sheet 1

INVENTOR:
EDWARD M. KURKECHIAN
BY Robert D. Mentag
ATTORNEY

Nov. 5, 1957   E. M. KURKECHIAN   2,811,736
WINDSHIELD WIPER
Filed Oct. 3, 1955   2 Sheets-Sheet 2
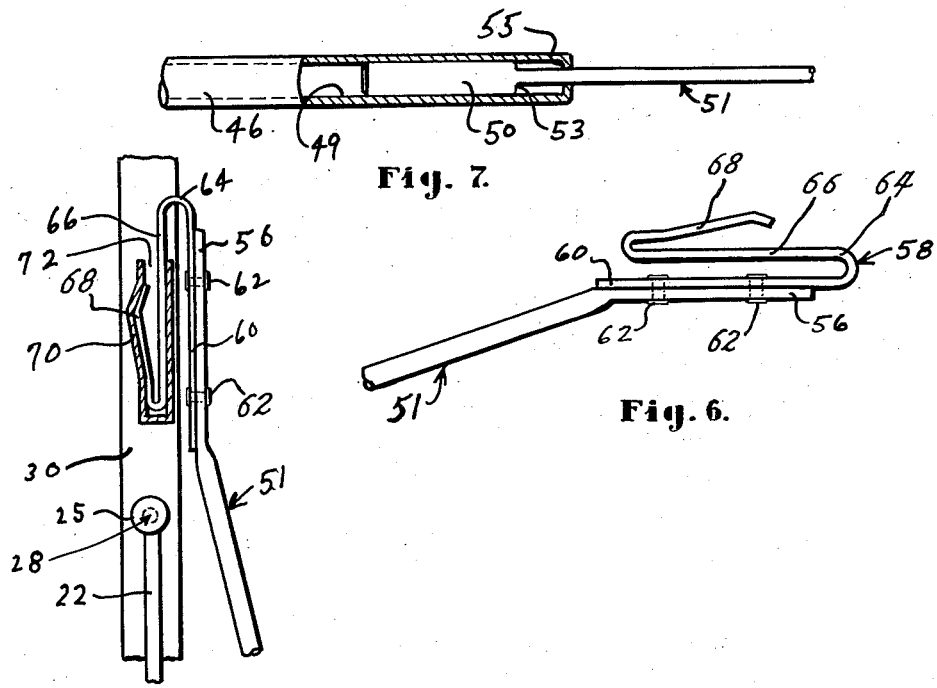
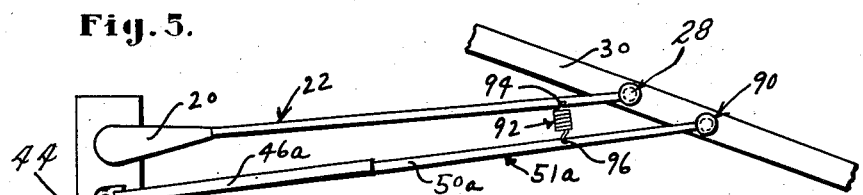
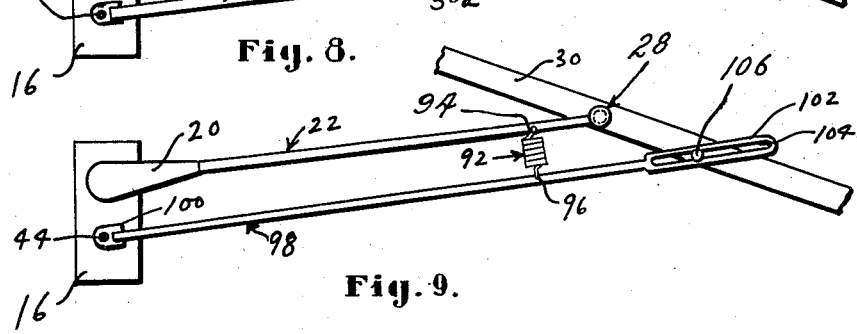
INVENTOR.
EDWARD M. KURKECHIAN
BY
Robert D. Mentag
ATTORNEY

United States Patent Office 2,811,736
Patented Nov. 5, 1957

2,811,736

WINDSHIELD WIPER

Edward Martin Kurkechian, Highland Park, Mich.

Application October 3, 1955, Serial No. 538,125

6 Claims. (Cl. 15—255)

This invention relates to a windshield wiper for use on a motor vehicle and the like, and, more particularly, to a windshield wiper which is especially adapted for use on a vehicle windshield of the curved or wrap-around type.

In an attempt to provide better vision for the operator of a motor vehicle, the auto industry has provided in the present motor vehicles a curved, or, what is commonly called a wrap-around windshield. The provision of wrap-around windshields in motor vehicles has resulted in the problem of providing a windshield wiper which can clean the enlarged curved side areas of vision provided by these wrap-around windshields. The present type windshield wipers have proved to be inefficient and incapable of cleaning around the side curved surfaces of a wrap-around vehicle windshield. Accordingly, it is the primary object of this invention to provide a novel and improved windshield wiper which is adapted to increase the effective cleaning range of a windshield wiper for use on a wrap-around vehicle windshield.

It is another object of this invention to provide a windshield wiper especially adapted for use on a vehicle wrap-around windshield which will be economical of manufacture, simple and compact in construction and highly efficient in operation.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 5 is a sectional view of the structure illustrated in Fig. 4, taken along the line 5—5 thereof;

Fig. 6 is an enlarged fragmentary front plan view of a portion of the secondary control arm of the structure illustrated in Fig. 2;

Fig. 7 is a fragmentary view, partly in section, of the control arm of the embodiment illustrated in Fig. 2;

Fig. 8 is a plan view of a second embodiment of the invention; and,

Fig. 9 is a plan view of a third embodiment of the invention.

Before explaining in detail the present invention, it is to be understood, that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not limitation.

Figure 1:
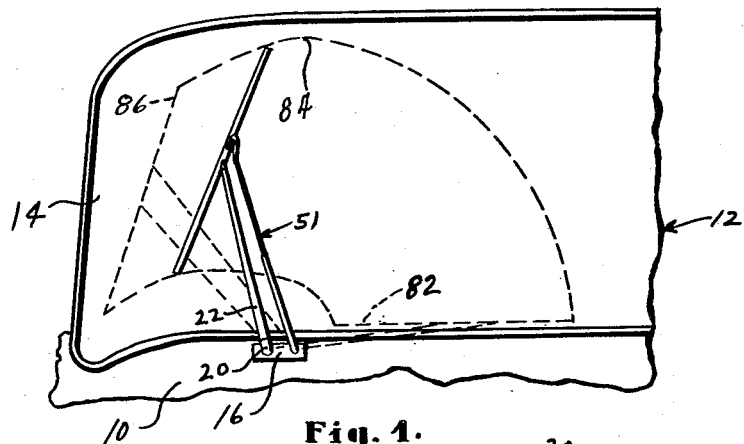
Fig. 1 is a partial elevational view of a vehicle wrap-around windshield which is provided with a windshield wiper made in accordance with the principles of the invention.

In the drawings, the numeral 10 designates a fragmentary portion of the hood portion of a motor vehicle which is provided with a wrap-around type windshield, generally designated as 12. As shown in Fig. 1, the windshield 12 curves downwardly and rearwardly at the sides thereof, as indicated at 14. Fixedly mounted on the hood portion 10 is a supporting block 16 through which is operatively mounted a drive shaft 18, which carries on the upper end thereof a windshield wiper support 20. The shaft 18 is adapted to be driven in an oscillatory manner by the usual windshield wiper motor, generally designated by the number 21.

The windshield support member 20 is adapted to carry a driving arm 22, which is hingedly carried on said support by means of the pivot pin 24. The upper end of the driving arm 22 terminates in an annular portion 25, which is provided with an aperture 26 therethrough. The driving arm 22 is rotatably connected to the supporting arm 30 of the windshield wiper blade 31, by means of a pivot pin, generally designated by the numeral 28.

The wiper blade supporting arm 30 is provided with an aperture 32 therethrough, which is adapted to receive the pin 28. The pin 28 is provided with a shoulder 34 which is adapted to abut the upper side of the wiper blade supporting arm 30, to fixedly secure said pin on the supporting arm 30. The upper end 40 of the pivot pin 28 is adapted to be rotatably seated in the aperture 26, in the driving arm member 25, and, the upper end of said pin is then peened over, as at 38, to retain the driving arm 22 on the pin 28.

Fixedly mounted on the supporting block 16 is a pivot pin 44, which is disposed parallel to the shaft 18 and on which is rotatably carried a supporting fixture 45. The lower portion 46 of the secondary or control arm 51 is pivotally carried on the fixture 45, by means of the pivot pin 48. The upper end of the control arm portion 46 is provided with an axially extending bore 49, in which is slidably and telescopically carried the lower enlarged end 50 of the upper portion of the control arm 51. The control arm portion 50 is provided with a shoulder 53 which abuts against the inwardly extended part 55 of the control arm portion 46, to limit the outward travel of the control arm portion 50.

The upper end of the control arm portion 50 is flattened, as at 56, and is adapted to carry a spring clip member 58. The spring clip member 58 is provided with an arm portion 60 which is fixedly connected to the control arm flattened portion 56, by any suitable means, as by the rivets 62. The spring arm 60 is integral with a U-shaped portion 64, which carries a second spring arm 66 on which is mounted a flexible retaining clip 68. As best seen in Fig. 5, the arm 66 and retaining clip 68 are adapted to be slidably and releasably locked in the spring retaining structure 70.

The spring retaining structure 70 is fixedly mounted on the outer side of the wiper blade supporting arm 30, and is open on the upper side thereof, as at 72, to slidably receive the spring portions 66 and 68. The spring retaining structure 70 may be fixed on the wiper blade supporting arm 30 by any suitable means, as by the two legs 74 and 76, which extend through suitable apertures in the arm 30 and are bent over against the arm 30, as indicated by the numerals 78 and 80.

In the practice of the invention, the instant windshield wiper will provide a wiping pattern which includes two phases of relatively smooth motion, along both the forward and backward travel of the wiper blade 31. The driving arm 22 and the secondary control arm 51 are mounted so as to rotate on parallel axes, whereby, when the driving arm 22 moves the wiper blade 31, the control arm 51 will have a freedom of movement along the same relative path in which the driving arm 22 travels.

Starting with the wiper blade in the position shown by the dotted lines and indicated by the numeral 82, the drive motor 21 will rotate the shaft 18, whereby, said shaft drives the driving arm 22 in a counter-clockwise direction, as viewed in Fig. 1. During the first phase of the forward sweep of the wiping pattern, from the position marked 82, to the point marked 84, the secondary arm 51 follows the motion of the driving arm 22, and, the upper portion 50 slides outwardly of the lower portion 46 until the shoulder 53 abuts the part 55. This action limits the inactive movement of the secondary arm 51, and, from this point forward the secondary arm controls the movement of the wiper blade 31. When the driving arm 22 moves the wiper blade 31 from the point 84 to the extreme end of travel indicated as 86, the wiper is going through what is known as the second phase of its forward travel or movement.

As the wiper blade 31 moves from the point 84 to the travel end 86, the wiper blade is caused to pivot in a clockwise direction around the pivot pin 28 because the control arm will not extend any longer. The aforementioned pivoting action permits the wiper blade 31 to move around the curved side 14 of the windshield in a more upright position than heretofore possible with the prior art wipers. It will be seen that the wiper blade 31 may rotate relative to the control arm 51 by means of the spring arm 66 flexing relative to the spring arm 60.

During the reverse movement, the action of the wiper is just the reverse of the forward action. The spring arms 66 and 60 will tend to move together again during the movement from the position marked 86 to the point marked 84, and, from the point 84 back to the starting position 82, the control arm part 50 will slide telescopically into the lower portion 46.

The desired pattern of wiping action may be varied for each individual window by varying, the distance between the points where the driving arm 22 is attached to the wiper blade 31 and the control arm is attached to the wiper blade, the length of the control arm 51 when the upper portion 50 is fully extended, and, the location of the fixed point at which the lower end of the control arm is connected and pivoted on the vehicle.

Fig. 8 discloses a second embodiment of the invention which includes the same type of driving arm 22 and its pivotal connection structure to the wiper blade supporting arm 30, but which is provided with a modified control arm 51a. The control arm 51a is hingedly mounted on the member 45 in the same manner as the embodiment of Fig. 2, and, the upper portion thereof 50a is telescopically mounted in the lower portion 46a as in the first embodiment. The outer end of the control arm upper portion 50a is hingedly and pivotally connected to the supporting wiper arm 30, as designated by the numeral 90, in a manner similar to that shown for pivotally connecting the driving arm 22 to the arm 30. The driving arms 22 and 51a of this second embodiment are interconnected by means of a coil spring 92, which is fixedly connected as indicated at 94 and 96, respectively.

Figure 2:
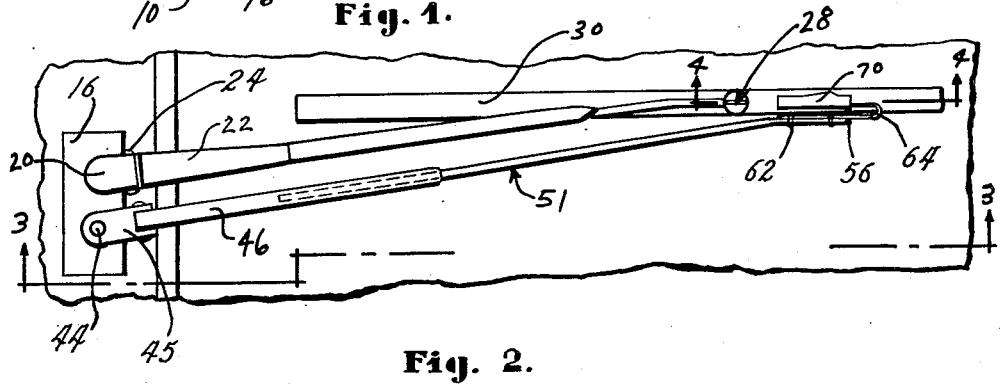
Fig. 2 is an enlarged fragmentary elevational view of the windshield wiper illustrated in Fig. 1.
Figure 3:
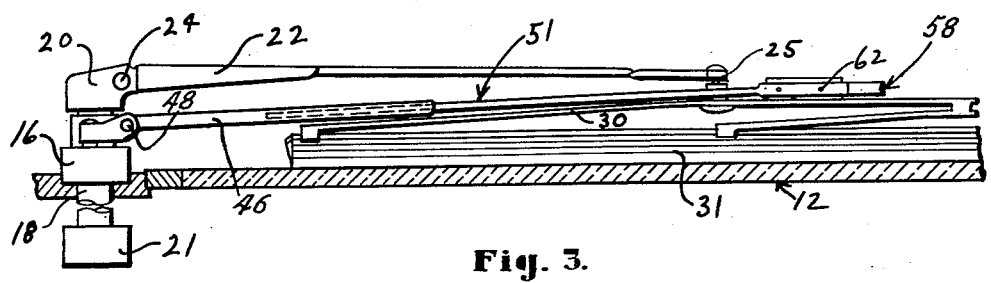
Fig. 3 is an elevational view, partly in section, of the structure illustrated in Fig. 2, taken along the line 3—3 thereof.
Figure 4:
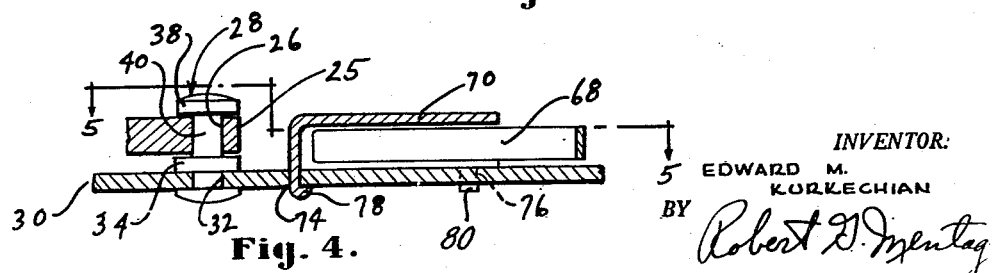
Fig. 4 is a fragmentary elevational view, partly in section, of the structure illustrated in Fig. 2, taken along the line 4—4 thereof.

In operation, the embodiment of Fig. 8 would function in a manner similar to the embodiment of Fig. 2, with the function of the spring 58 being taken over by the spring 92. The wiper blade 31 would function similar to the first embodiment, in that it would pass through two phases in its forward and reverse movements. During the first phase, from the starting position 82 to the point 84, the control arm 51a would have its upper end portion 50a slidably extended to its full length. Between the points 84 and 86, during the second phase of its travel, the wiper blade 31 will be pivoted in a clockwise direction around the pivot pin 90 and the spring 92 will be subjected to a tension, since the outer ends of the driving arm 22 and the control arm 51a will be separated slightly by this action. The aforementioned pivoting action permits the wiper blade 31 to move around the curved side 14 of the windshield in a manner similar to that of the first embodiment. On the return movement, the tensioned spring 92 functions to return the driving arm 22 and the control arm 51a to their original relative positions.

Fig. 9 discloses a third embodiment of the invention which includes the same type of driving arm 22 and its pivotal connection structure to the wiper blade supporting arm 30, but which is provided with a modified control arm 98. The control arm 98 is provided with an annular lower end 100 which is adapted to be rotatably mounted on the pin 44 on the supporting block 16. The upper end of the control arm 98 is provided with an enlarged portion 102 which is provided with an elongated slot therethrough, as 104, which is adapted to be slidably engaged with a pin as 106 on the wiper blade supporting arm 30. The pin 106 may be provided with head thereon to prevent the pin from being disengaged with the slot 104. The driving arm 22 and the control arm 98 are interconnected by a coiled spring 92 in a manner similar to the embodiment of Fig. 8.

In operation, the embodiment of Fig. 9 functions in the same manner as the embodiment of Fig. 8. The only difference is the second phase of the wiping pattern does not start until the pin 106 has slid to the upward end of the slot 104.

It will be obvious, that the present type windshield wipers may be converted to one having the characteristics of the instant invention by merely providing said windshield wipers with the control arm of the present invention and by making the driving arms pivotally connected to the wiper blade supporting arm.

It will be obvious, that the instant invention provides a windshield wiper structure which provides a greater wiping area for windows of the wrap-around variety, by providing more lateral travel in the latter portion of the wiping pattern.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a windshield wiper for use on a curved windshield of a vehicle, the combination of: a wiper blade; a driving arm having the lower end thereof pivotally mounted on a drive shaft on the vehicle, and the upper end thereof pivotally connected to said blade; means for actuating said drive shaft in an oscillatory manner so as to move the driving arm and wiper blade forwardly and backwardly across the windshield in a wiping pattern; a control arm having the lower end thereof pivotally mounted on a fixed shaft which is parallel to said drive shaft; the upper end of said control arm being directly connected to said wiper blade at a point spaced apart from and above the connection point between the driving arm and the wiper blade; means for maintaining said arms in a first relative position during a first phase of the wiping pattern; and means adapted to change the relative positions of said arms so as to move them apart to a second relative position during a second phase of the wiping pattern to provide the wiper blade with increased lateral movement during said second phase of the wiping pattern over the curved end of a windshield.

2. The invention as set forth in claim 1, wherein: the upper end of the control arm is connected to the wiper blade by means of a spring which is inoperative during the first phase of the wiping pattern.

3. The invention as set forth in claim 1, wherein: the upper end of the control arm is rotatably connected to the wiper blade; and, the driving and control arms are interconnected by a resilient biasing means.

4. The invention as set forth in claim 1, wherein: the upper end of the control arm is pivotally and slidably connected to the wiper blade; and, the driving and control arms are interconnected by a resilient biasing means.

5. In a windshield wiper for use on a curved windshield of a vehicle, the combination of: a wiper blade; a driving arm pivotally connected to said wiper blade; means for actuating said driving arm so as to move the driving arm and wiper blade forwardly and backwardly in a wiping pattern; a control arm having the lower end thereof pivotally mounted adjacent the lower end of the driving arm; said control arm being connected to said wiper blade and adapted to provide an increasing effective length thereof during a first phase of the wiping pattern so as to maintain the driving and control arms in a substantially constant relative position; means adapted to change the relative positions of said arms during a second phase of the wiping action to permit increased lateral movement of the wiper blade around the curved end of the windshield; and, said control arm comprising a lower part and an upper part telescopically mounted in said lower part and extendable outwardly thereof during the first phase of said wiping pattern.

6. In a windshield wiper for use on a curved windshield of a vehicle, the combination of: a wiper blade; a driving arm pivotally connected to said wiper blade; means for actuating said driving arm so as to move the driving arm and wiper blade forwardly and backwardly in a wiping pattern; a control arm having the lower end thereof pivotally mounted adjacent the lower end of the driving arm; said control arm being connected to said wiper blade and adapted to provide an increasing effective length thereof during a first phase of the wiping pattern so as to maintain the driving and control arms in a substantially constant relative position; means adapted to change the relative positions of said arms during a second phase of the wiping action to permit increased lateral movement of the wiper blade around the curved end of the windshield; and, the upper end of the control arm being provided with a slot in which is slidably mounted a pin which is fixed on the wiper blade supporting arm, whereby said pin will slide in said slot and up to the upper end thereof during the first phase of said wiping action.

References Cited in the file of this patent

UNITED STATES PATENTS

| | | |
|---|---|---|
| 2,356,424 | Paton | Aug. 22, 1944 |
| 2,552,822 | Smulski | May 15, 1951 |

FOREIGN PATENTS

| | | |
|---|---|---|
| 1,099,262 | France | Mar. 16, 1955 |